(12) United States Patent
Pouli et al.

(10) Patent No.: US 12,155,963 B2
(45) Date of Patent: Nov. 26, 2024

(54) METHODS FOR CONVERTING AN IMAGE AND CORRESPONDING DEVICES

(71) Applicant: FONDATION B-COM, Cesson-Sévigné (FR)

(72) Inventors: Foteini Tania Pouli, Le Rheu (FR); Olivier Weppe, Cesson-Sévigné (FR); Benoît Le Ludec, Cesson-Sévigné (FR)

(73) Assignee: FONDATION B-COM, Cesson-Sévigné (FR)

( * ) Notice: Subject to any disclaimer, the term of this patent is extended or adjusted under 35 U.S.C. 154(b) by 343 days.

(21) Appl. No.: 17/786,091

(22) PCT Filed: Dec. 18, 2020

(86) PCT No.: PCT/EP2020/087188
§ 371 (c)(1),
(2) Date: Jun. 16, 2022

(87) PCT Pub. No.: WO2021/123284
PCT Pub. Date: Jun. 24, 2021

(65) Prior Publication Data
US 2023/0050498 A1 Feb. 16, 2023

(30) Foreign Application Priority Data

Dec. 20, 2019 (EP) .................................... 19306742

(51) Int. Cl.
*H04N 7/01* (2006.01)
*G06T 5/90* (2024.01)
(Continued)

(52) U.S. Cl.
CPC ............ *H04N 7/0125* (2013.01); *G06T 5/90* (2024.01); *G06T 5/92* (2024.01); *H04N 9/77* (2013.01);
(Continued)

(58) Field of Classification Search
None
See application file for complete search history.

(56) References Cited

U.S. PATENT DOCUMENTS

2017/0002307 A1* 1/2017 Ikefuji .................... C12M 41/34
2020/0388207 A1* 12/2020 Jo ......................... G09G 3/2007

FOREIGN PATENT DOCUMENTS

WO 2015/000919 1/2015

OTHER PUBLICATIONS

International Search Report for PCT/EP2020/087188 dated Feb. 22, 2021, 4 pages.
(Continued)

*Primary Examiner* — Lennin R RodriguezGonzalez
(74) *Attorney, Agent, or Firm* — NIXON & VANDERHYE

(57) ABSTRACT

The invention concerns a method for converting an input image comprising an input luminance component made of elements into an output image comprising an output luminance component made of elements, the respective ranges of the output luminance component values and input luminance component element values being of different range extension. the method comprises for the input image: computing a value of a general variable representative of at least two input luminance component element values; transforming each input luminance component element value into a corresponding output luminance component element value according to the computed general variable value; and converting the input image using the determined output luminance component element values. The transforming step uses a set of pre-determined output values organized into a 2D Look-Up-Table (2D LUT) comprising two input arrays indexing a set of chosen input luminance component values and a set of chosen general variable values respectively, each pre-determined output value matching a pair of (Continued)

values made of an indexed input luminance component value and an indexed general variable value, the input luminance component element value being transformed into the output luminance component element value using at least one predetermined output value.

13 Claims, 7 Drawing Sheets

(51) Int. Cl.
 G06T 5/92 (2024.01)
 H04N 9/77 (2006.01)
(52) U.S. Cl.
 CPC ............... *G06T 2207/10016* (2013.01); *G06T 2207/20208* (2013.01)

(56) References Cited

OTHER PUBLICATIONS

Written Opinion of the ISA for PCT/EP2020/087188 dated Feb. 22, 2021, 6 pages.
Khan et al., "A Tone-Mapping Technique Based on Histogram Using a Sensitivity Model of the Human Visual System" IEEE Transactions on Industrial Electronics, vol. 65, No. 4, Apr. 1, 2018, pp. 3469-3479.
Ozcinar et al., "HDR Video Coding based on a temporally constrained Tone Mapping Operator", 2016 Digital Media Industry & Academic Forum (DMIAF), IEEE, Jul. 4, 2016, pp. 43-47.
Reinhard et al., "Image display algorithms for high- and low-dynamic-range display devices", SID_Journals, 2007, 18 pages.

\* cited by examiner

METHODS FOR CONVERTING AN IMAGE AND CORRESPONDING DEVICES

CROSS-REFERENCE RELATED TO PRIOR APPLICATIONS

This application is the U.S. national phase of International Application No. PCT/EP2020/087188 filed Dec. 18, 2020 which designated the U.S. and claims priority to EP 19306742.8 filed Dec. 20, 2019, the entire contents of each of which are hereby incorporated by reference.

BACKGROUND OF THE INVENTION

Field of the invention

The present invention relates generally to converting an image, in particular a video picture.

Description of the Related Art

Recent advancements in display technology are beginning to allow an extended range of luminance to be displayed. Technologies allowing for extensions in the range of luminance in image content are known as "High Dynamic Range" imaging, often shortened to HDR.

To prepare standard content, herein referred to as SDR for "Standard Dynamic Range", for HDR display devices, reverse (or inverse) tone mapping operators (ITMO) can be employed. Such methods process notably the luminance information of colored areas in the image content with the aim of recovering or recreating the appearance of the original scene. Typically, ITMOs take a SDR image as input, expand the luminance range and subsequently process highlights or bright regions locally to enhance the HDR appearance of colors in the corresponding image. For example, the patent application WO/2017/190786 proposes a method for expanding range of values of a luminance components enabling the creation of HDR signals.

The ability to perform round-tripping, i.e. to convert SDR content to HDR and then back to SDR again, whilst minimizing the change to the visual experience, may be a requirement for some devices like display devices. Likewise, round-tripping from HDR to SDR and then back to HDR may also be a requirement.

SUMMARY OF THE INVENTION

In this context according to a first aspect of the invention, it is proposed a method for converting an input image comprising an input luminance component made of elements into an output image comprising an output luminance component made of elements, the respective ranges of the output luminance component values and input luminance component element values being of different range extension, the method comprising for the input image computing a value of a general variable ($L_{med}$) representative of at least two input luminance component element values, transforming each input luminance component element value into a corresponding output luminance component element value according to the computed general variable value, and converting the input image using the determined output luminance component element values, wherein the transforming step uses a set of pre-determined output values organized into a 2D Look-Up-Table (2D LUT) comprising two input arrays indexing a set of chosen input luminance component values and a set of chosen general variable values respectively, each pre-determined output value matching a pair of values made of an indexed input luminance component value and an indexed general variable value, the input luminance component element value being transformed into the output luminance component element value using at least one predetermined output value.

Mapping each input luminance component element value to an output luminance component element value advantageously allows to skip the complex computations involved in prior art solutions for converting an image into an output image having a High Dynamic Range. Moreover the invention allows to dynamically adapt the output luminance component to each image thanks to the general variable which is computed image by image.

In an embodiment, the input image can belong to a video sequence comprising several input images, the transforming step being then further based on adaptable parameters ($m_a$, $m_b$, $m_c$) set for the whole video sequence by an operator according to a given context, said adaptable parameters being used to update each indexed input luminance element value to said context.

Preferably the method further comprises processing the output image to be displayed on a display device, the values of said adaptable parameters being adaptable according to the display device characteristics forming said context.

In an embodiment, each predetermined output value of the set of predetermined output values can be predetermined by raising the matching indexed input luminance element value to an exponent ($f_y$) dependent on the computed general variable value.

For example, computing the general variable value comprising computing a measure of central tendency of values representative of two or more input luminance component element values.

The measure of central tendency can be a median.

For example each output value $L_{out\_pred}$ of the set of output values can be pre-determined such as:

$$L_{out\_pred} = \frac{f_m(L_{lin\_ind})^{f_y(L_{med\_ind})}}{L_{lin\_ind}^s}$$

Where $L_{med\_ind}$ is an indexed general variable value, $L_{lin\_ind}$ is an indexed input luminance component element value, $f_m$ is a function based on said adaptable parameters, s is a control parameter, $f_y$ is the exponent.

For example the functions $f_m$ and $f_y$ can be defined such as $$f_m(L_{lin\_ind}) = \frac{m_b * (L_{lin\_ind})^{\frac{1}{m_c}}}{m_a - (L_{lin\_ind})^{\frac{1}{m_c}}}$$

and $$f_y(L_{med\_ind}) = \frac{1}{g * \log_{10}(L_{med\_ind}) + o}$$

Where $m_a$, $m_b$, $m_c$ are the adaptable parameters, o is a predetermined offset, and g is a predetermined gain value.

In an embodiment the method can further comprises a preliminary step for determining an intermediate luminance component made of elements, by transforming each input luminance component element value into an intermediate luminance component element value by using another set of pre-determined output values based on the adaptable parameters, and wherein the general variable value is computed by using the intermediate luminance component element values.

Alternatively each output value $L_{out\_pred}$ of the set of output values can be pre-determined such as:

$$L_{out\_pred} = \frac{f_m\left(L_{lin\_ind}{}^{f_\gamma(L_{med\_ind})}\right)}{L_{lin\_ind}^s}$$

Where $L_{med\_ind}$ is an indexed general variable value, $L_{lin\_ind}$ is an indexed input luminance component element value, $f_m$ is a function based on said adaptable extrinsic parameters, s is a control parameter, $f_y$ is the exponent.

The functions $f_m$ and $f_y$ can be then defined such as:

$$f_m\left(L_{lin\_ind}{}^{f_\gamma(L_{med\_ind})}\right) = \left(\frac{m_a * (L_{lin\_ind})^{f_\gamma(L_{med\_ind})}}{m_b + (L_{lin\_ind})^{f_\gamma(L_{med\_ind})}}\right)^{m_c}$$

and $$f_\gamma(L_{med\_ind}) = g * \log_{10}(L_{med\_ind}) + o$$

Where $m_a$, $m_b$, $m_c$ are the adaptable parameters, o is a predetermined offset, and g is a predetermined gain value.

According to a second aspect of the invention, it is proposed a device for converting an input image comprising an input luminance component made of elements into an output image comprising an output luminance component made of elements, the respective ranges of the output luminance component values and input luminance component element values being of different range extension. The device is configured for computing a value of a general variable representative of at least two input luminance component element values, transforming each input luminance component element value into a corresponding output luminance component element value according to the computed general variable value, and converting the input image using the output luminance component element values, wherein transforming each input luminance component element value into a corresponding output luminance component element value uses a set of pre-determined output values organized into a 2D Look-Up-Table (2D LUT) comprising two input arrays indexing a set of chosen input luminance component values and a set of chosen general variable values respectively, each pre-determined output value matching a pair of values made of an indexed input luminance component value and an indexed general variable value, the input luminance component element value being transformed into the output luminance component element value using at least one predetermined output value.

In an embodiment, the input image can belong to a video sequence comprising several input images, and wherein transforming each input luminance component element value into a corresponding output luminance component element value being further based on adaptable parameters set for the whole video sequence by an operator according to a given context, said adaptable parameters being used to update each indexed input luminance element value to said context.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

DESCRIPTION OF THE PREFERRED EMBODIMENTS

The invention will now be described by means of specific non-limiting exemplary embodiments and with reference to the figures.

Figure 1:
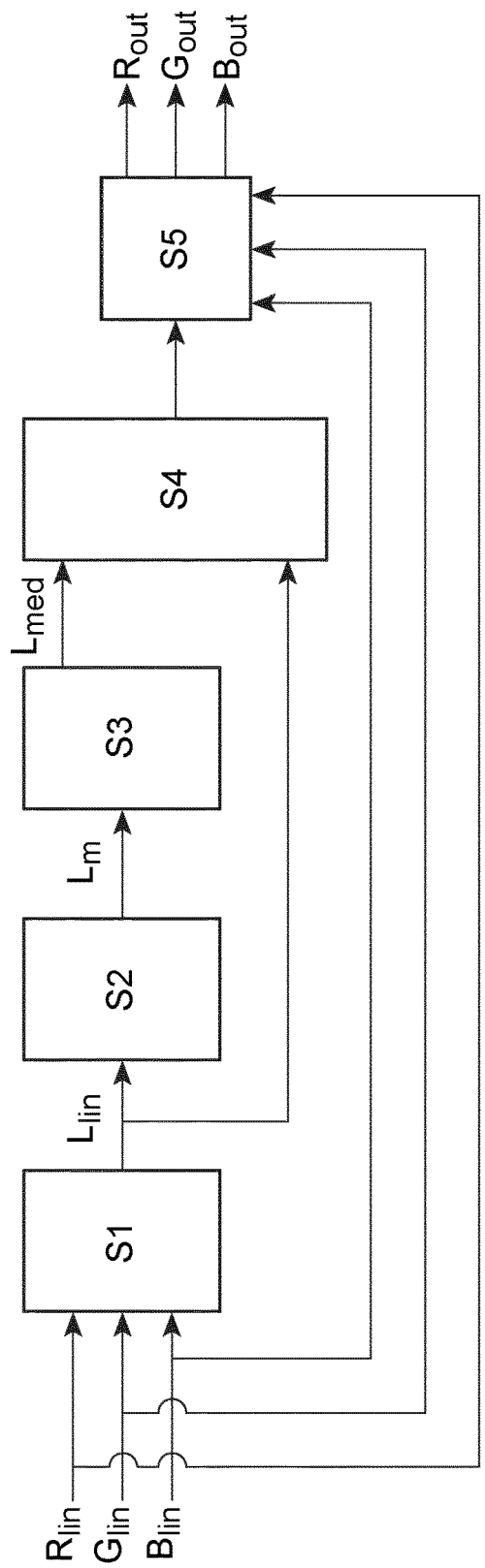
FIG. 1 illustrates an embodiment of a method according to the first aspect of the invention.

FIG. 1 illustrates a first embodiment of the invention for converting an input image made of elements (pixels), into an output image.

For the purposes of this disclosure, "element" may refer to a single pixel (or picture element) of a component (e.g. a luminance component) of still image, or of a frame or subframe of a video image. More generally, "element" refers to any structure with which a particular value (here a particular value of luminance) is associated to partly define an image.

For example, the input image belongs to a video sequence made of several (at least two) successive input images. An input image is here a RGB color image made of three linear color components: Red $R_{lin}$, Green, $G_{lin}$ and Blue $B_{lin}$. Each color component is made of elements respectively corresponding to the input image pixels. Other color model could be used for said input image like the YCbCr model. In the following description, the RGB color model is considered.

In a first step S1, the input color components $R_{lin}$, $G_{lin}$ and $B_{lin}$ are processed to obtain an input Luminance component $L_{lin}$ according to known methods. For instance the RGB input image is converted in another linear space where a converted image comprises three components X, Y and Z, Y being a linear luminance component, called $L_{lin}$ below, corresponding to the input luminance component in the following description. Such a conversion process is for example described in standards ITU-R BT2020 and BT709.

In an optional second step S2, the input luminance component is pre-processed to provide an intermediate Luminance component $L_m$.

In a third step S3 the value of a general variable $L_{med}$ is computed. The general variable $L_{med}$ is representative of at least two input luminance component element values. Examples for computing said general variable value $L_{med}$ are given below with reference to FIGS. 2 and 3.

In a fourth step S4, each input element value of the input component $L_{lin}$ is mapped into an element value of an output luminance component $L_{out}$, according to a given general variable value $L_{med}$, computed for said input image. This step involves using a set of pre-determined output values $L_{out\_pred}$. Preferably the set is organized into a 2D Look-Up-Table (2D LUT) comprising two input arrays indexing a set of chosen input luminance component values and a set of chosen general variable values. Each pre-determined output value matches a pair made of one indexed input luminance component value and one indexed general variable value. Every output luminance component element value $L_{out}$ is determined by using one or more pre-determined output values $L_{out\_pred}$. More information about the mapping process is provided with reference to the FIGS. 2, 3 and 5.

In a fifth step S5, the output luminance component $L_{out}$ is processed to get the output linear color components $R_{out}$, $G_{out}$ and $B_{out}$ according to the same color model than the input color components. Such a step is for example described in "Pouli, Tania, et al. *"Color correction for tone reproduction"*, Color and Imaging Conference. 2013." This last step S5 is performed using the input linear color component $R_{lin}$, $G_{lin}$ and $B_{lin}$ as detailed below.

The process described in FIG. 1 allows converting an input image having a first dynamic range into an output image having a second dynamic range. For instance the first dynamic range may be a "Standard Dynamic Range" or SDR and the second dynamic range may be a "High Dynamic Range" or HDR that is higher than the first dynamic range. Such a conversion is generally called "tone expansion". Inversely, the first dynamic range may be higher than the second dynamic range. This other conversion is called "tone compression". More specifically, the embodiment deals with the luminance expansion and compression.

Figure 2:
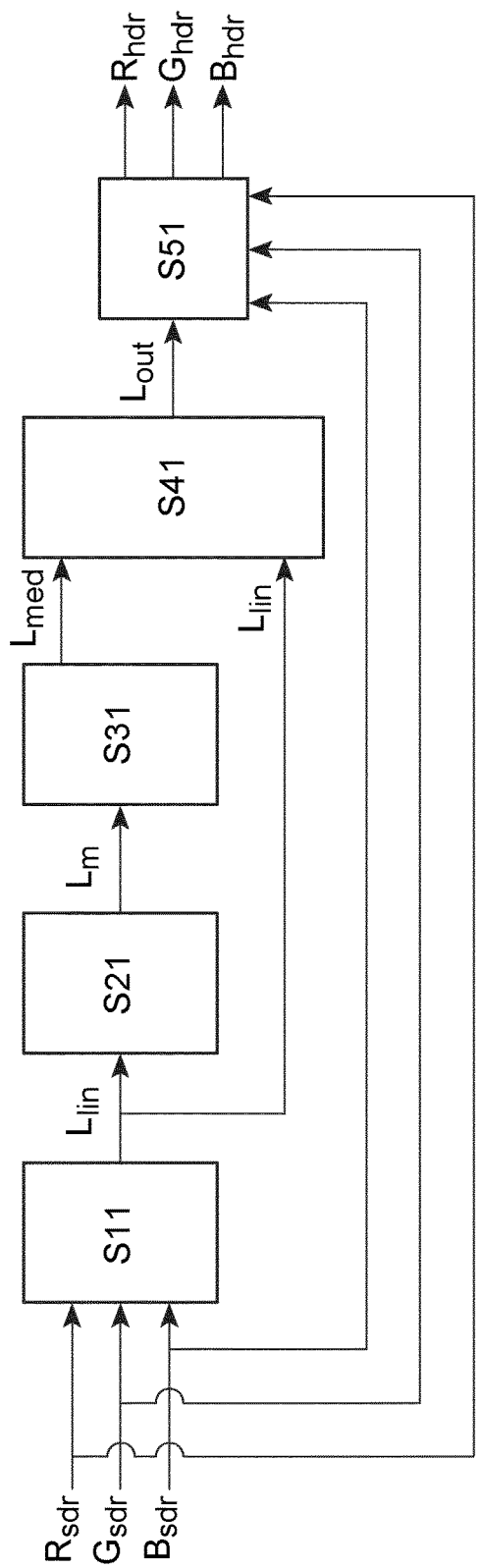
FIG. 2 represents a first variant of the embodiment illustrated in FIG. 1.

FIG. 2 illustrates an implementation of the process of FIG. 1, when converting a standard dynamic range (SDR) image or video content to a high dynamic range (HDR) image or video content such as ITU-R BT.2100 for example. This conversion is generally called a "tone expansion".

In a first step S11, the input color components $R_{sdr}$, $G_{sdr}$ and $B_{sdr}$ are processed to obtain the input Luminance component $L_{lin}$ according to known methods for example described in standards ITU-R BT2020 and BT709.

In a second optional step S21, the input luminance component $L_{lin}$ is pre-processed to provide the intermediate luminance component $L_m$. Advantageously the pre-processing allows updating the input luminance componence to a context defined by adaptable extrinsic parameters. Those parameters could define the display context of the whole video content, which could be related a commercial HDR television for example. The parameter values are adapted to specific predefined values by an operator, prior to carrying out the conversion of FIG. 2.

This step may involve using another set of pre-determined output values. Preferably this other set is organized into a 1D Look-Up-Table (1 D LUT) comprising one input array indexing a set of chosen input luminance component element values.

For example it comes:

$$L_{m\_pred} = f_m(L_{lin\_ind}) = \frac{m_b * (L_{lin\_ind})^{\frac{1}{m_c}}}{m_a - (L_{lin\_ind})^{\frac{1}{m_c}}} \quad (1)$$

where $L_{m\_pred}$ is an intermediate luminance component element value of the other set of predetermined value;

$L_{lin\_ind}$ is an input luminance component element value from the set of indexed input luminance component element values; and $m_a$, $m_b$, $m_c$ are the adaptable extrinsic parameters whose values have been previously set.

In an alternative, if the element value of the input luminance $L_{lin}$ is equal to one of the values indexed $L_{lin\_ind}$ in the input array of the 1D LUT, the corresponding element value of intermediate Luminance $L_m$ is equal to the corresponding value of the other set of predetermined output values $L_{m\_pred}$. Else the element value of the intermediate luminance $L_m$ is interpolated from two values of the other set of predetermined output values $L_{m\_pred}$ as explained below with reference to FIG. 4. Indeed only selected values of the input luminance elements are indexed in the 1D LUT in order to limit its size. This alternative is advantageous if the element values are represented over a high number of bits for achieving a certain level of precision. In another alternative, there is not any interpolation of the element value of the intermediate luminance $L_m$. The 1 DLUT indexed all the possible values when values are represented over a limited number of bits (for example 10 or 11 bits) which allows keeping a reasonable storage capacity (for instance regarding a Read-Only Memory, ROM).

A third step S31 comprising computing the value of the general variable $L_{med}$ from at least part of the element values of the intermediate luminance $L_m$. In an embodiment, the value is a measure of central tendency of the intermediate input luminance component element values. All input the intermediate luminance element values can be considered for computing the general variable value, or only some of them (at least two). For example the measure of central tendency can be a median or a mean. In the following description it is considered that the value of the general variable is obtained by computing the median from all the element values of the intermediate luminance $L_m$. If the step S21 is not performed, the value of the general variable $L_{med}$ is directly computed from the element values of the input luminance $L_{lin}$.

The value of the general variable is computed for each image and is dynamically adapted image per image when a video sequence is considered.

Alternatively, the general variable could be obtained by computing the maximum of all the element values of the intermediate luminance $L_m$.

A fourth step S41 comprises mapping each input element value of the input component $L:_{lin}$ into an element value of the output luminance component $L_{out}$ according to the given general variable value $L_{med}$, computed for the input image. As explained previously, this step involves using a set of pre-determined output values $L_{out\_pred}$ organized here into a 2D Look-Up-Table (2D LUT) comprising two input arrays indexing a set of chosen input luminance component values $L_{in\_ind}$ and a set of chosen general variable values $L_{med\_ind}$. Each pair consisting of an indexed input luminance element value and an indexed general variable value, matches an output value from a set of predetermined output values. According to one embodiment, every output value $L_{out\_pred}$ is predetermined by raising the indexed input luminance element values to an exponent $f_y$ representative of an expansion exponent. A definition of the expansion exponent is for example given in the patent application WO2017/103399. Moreover, according to a preferred embodiment, every output value $L_{out\_pred}$ is predetermined by updating each indexed input luminance element value to the specific adaptable parameter values predefined by the operator.

In addition the step S41 may allow controlling the saturation of the output image by performing saturation adjustments on the input luminance component. Indeed performing a tone expansion may change the original saturation. According to one embodiment, saturation is adjusted by raising the indexed input luminance element values to an exponent s whose value is chosen for correcting saturation changes.

For example for performing a tone expansion, it comes:

$$L_{out\_pred} = \frac{f_m\left(L_{lin\_ind}^{f_\gamma(L_{med\_ind})}\right)}{L_{lin\_ind}^{s}} \quad (2)$$

where $L_{med\_ind}$ is the general variable value from the set of indexed general variable values, $L_{lin\_ind}$ is the indexed input luminance component element value from the set of indexed input luminance component element values, $f_m$ is the function based on said adaptable extrinsic parameters for updating the indexed input luminance component element value, s is a control parameter for performing saturation adjustment, and $f_y$ is the exponent representative of an expansion exponent.

In case the step S21 is implemented, the same function $f_m$ is used for computing each output values of the other set of predetermined output values.

Consequently, $f_m$ can be expressed according to the expression below:

$$f_m(L_{lin\_ind}) = \frac{m_b * (L_{lin\_ind})^{\frac{1}{m_c}}}{m_a - (L_{lin\_ind})^{\frac{1}{m_c}}}. \quad (3)$$

$f_y$ can be expressed according to the expression below:

$$f_\gamma(L_{med\_ind}) = \frac{1}{g * \log_{10}(L_{med\_ind}) + o}, \quad (4)$$

where g is a predetermined gain, and o is a predetermined offset.

In this example, $f_y$ monotonously decreases when $L_{med\_ind}$ increases.

For example, when an operator wants to adapt the values of the adaptable parameters $m_a$, $m_b$, $m_c$ to get a profile that is well adapted for commercial HDR television, it comes:

$m_a$=1.5284, $m_b$=0.5279 and $m_c$=0.7997.

For example, in an embodiment it comes:

s=1, g=0.06 and o=1.

The expressions (3) and (4) above are given as examples and do not exclude other implementations for $f_m$ and $f_y$.

For example, $f_m$ may alternatively take a polynomial form of degree n, where polynomial parameters $p_n, \ldots, p_0$ may be determined through a polynomial regression against data taking a desired form. This alternative form may be for instance defined manually by an operator like an artist, and potentially further adjusted to guide the behavior of the $f_m$ function:

$$f_m(L_{lin\_ind}) = P_n L^n_{lin\_ind} + P_{n+1} L^{n-1}_{lin\_ind} + \ldots + P_1 L_{lin_{ins}} + p_0. \quad (5)$$

When the element value of the input luminance $L_{lin}$ and the general variable value $L_{med}$ respectively matches indexed values, the element value of the output luminance $L_{out}$ corresponds to the output value $L_{out\_pred}$ associated to said indexed value in the 2DLUT. Otherwise, the element value of the output luminance $L_{out}$ is interpolated from two output values $L_{out\_pred}$ from the set of predetermined output values as explained below with reference to FIG. 5.

Mapping each input luminance component element value to an output luminance component element value advantageously allows to skip the complex computations involved in prior art solutions for converting an image into an output image having a High Dynamic Range. Those solutions involve the application of an exponential function for each processed input luminance component element value. The complexity of this application is not well-adapted to some hardware implementations like the FPGAs ("Field-Programmable Gate Array") which can perform a limited amount of operations. Moreover the 2D LUT according to the invention allows to dynamically adapt the output luminance component to each image thanks to the general variable which is computed image by image. Other settings related to the operator choices can also be taken into account for providing the output luminance component, by using specific adaptable parameters as described above.

In a fifth step S51, the output luminance component $L_{out}$ and the input color components $R_{sdr}$, $G_{sdr}$, $B_{sdr}$ are used to obtain the output color components $R_{hdr}$, $G_{hdr}$, $B_{hdr}$ considering the saturation correction already performed using the parameter s in step S41 (see equation 2). For example, based on a standard saturation correction approach, such as for instance according to the methods described in R. Fattal, D. Lischinski et M. Werman, «Gradient domain high dynamic range compression» ACM transactions on graphics (TOG), vol. 21, n° 13, pp. 249-256, 2002, the saturation corrected output color components $R_{hdr}$, $G_{hdr}$ and $B_{hdr}$ can be computed as follows:

$$X_{hdr} = X_{sdr}{}^s * L_{out}, \quad (6)$$

where $X_{hdr}$ can be $R_{hdr}$ or $G_{hdr}$ or $B_{hdr}$ and $X_{sdr}{}^s$ can be $R_{sdr}{}^s$ or $G_{sdr}{}^s$ or $B_{sdr}{}^s$ respectively.

As the computation of $L_{out\_pred}$ through the 2D LUT (see equation 2) already includes a normalization by $L_{lin_{ind}}{}^s$, the above formula scales the input color in a manner consistent to the changes in the luminance, and simultaneously corrects their saturation.

Figure 3:
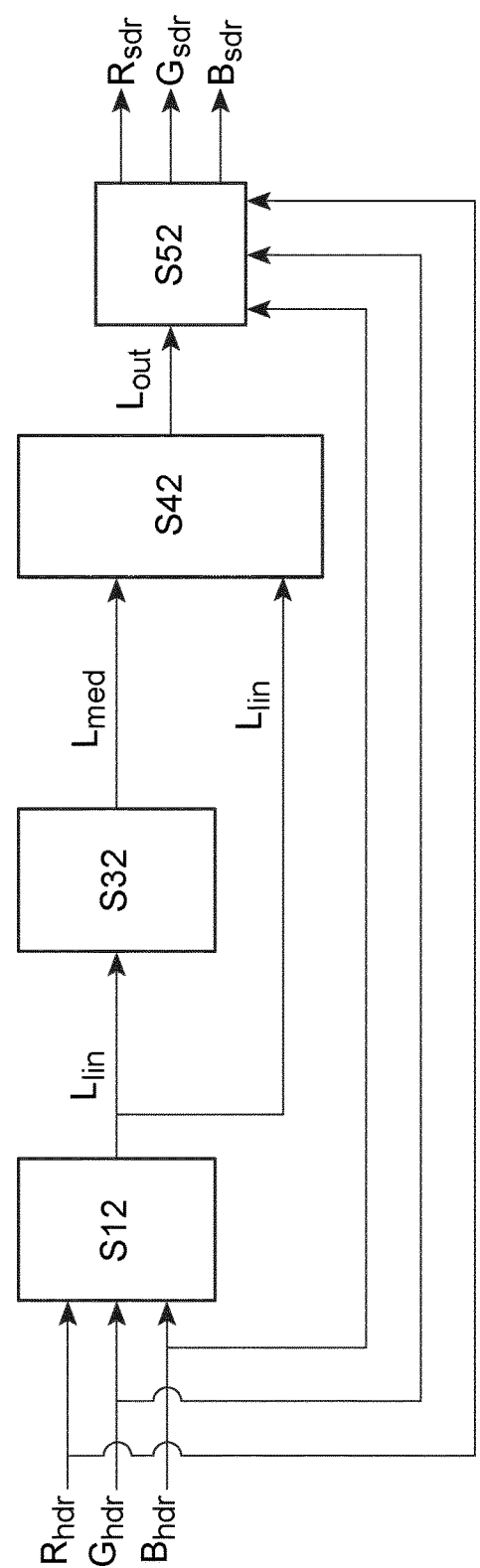
FIG. 3 represents a second variant of the embodiment illustrated in FIG. 1.

FIG. 3 illustrates another implementation of the process of FIG. 1, when converting a high dynamic range (HDR) image or video content to a standard dynamic range (SDR) image or video content. This conversion is generally called a "tone compression".

In a first step S12, the input color components $R_{hdr}$, $G_{hdr}$ and $B_{hdr}$ are processed to obtain the input Luminance component $L_{lin}$ according to known methods as previously explained.

For converting an HDR image to a SDR image, a pre-processing step is not necessary. If the step S2 is not optional, due to hardware implementation choices for example, the embodiment illustrated in FIG. 3 could include an additional step for applying the Identity function, as the output $L_{lin}$ would be identical to the input $L_{lin}$.

In a second step S32, the general variable value $L_{med}$ is computed directly from the input luminance component element values as explained with reference to step S31 in FIG. 2.

A third step S42 comprises mapping each input element value of the input component $L_{lin}$ into an element value of the output luminance component $L_{out}$, according to the given general variable value $L_{med}$, computed for the input image, as previously described with reference to FIG. 2, step S41. In the same way the step S42 involves using a set of pre-determined output values $L_{out\_pred}$ organized here into a 2D Look-Up-Table (2D LUT) comprising two input arrays indexing a set of chosen input luminance component values $L_{lin\_ind}$ and a set of chosen general variable values $L_{med\_ind}$. Each pair consisting of an indexed input luminance element value and an indexed general variable value, matches an output value from a set of predetermined output values. Preferably every output value $L_{out\_pred}$ is predetermined by raising the indexed input luminance element values to an exponent $f_y$ representative of an expansion exponent. Moreover, according to a preferred embodiment, every output value $L_{out\_pred}$ is predetermined by updating each indexed input luminance element value to the specific adaptable parameter values predefined by the operator.

In addition the step S42 may allow controlling the saturation of the output image by performing saturation adjustments on the input luminance component. Indeed performing a tone expansion may change the original saturation. According to one embodiment, saturation is adjusted by raising the indexed input luminance element values to an exponent s whose value is chosen for correcting saturation changes.

For example for performing a tone compression, it comes:

$$L_{out\_pred} = \frac{f_m\left(L_{lin\_ind}^{f_y(L_{med\_ind})}\right)}{L_{lin\_ind}^s} \quad (7)$$

Where $L_{med\_ind}$ is the general variable value from a set of indexed general variable values, $L_{Lin\_ind}$ is the indexed input luminance component element value from a set of indexed input luminance component element values, $f_m$ is a function based on said adaptable extrinsic parameters allowing to update $L_{lin\_ind}$, s is a control parameter for performing saturation adjustment, $f_y$ is the exponent.

For example, the functions $f_m$ and $f_y$ can be expressed according to the expressions below respectively:

$$f_m(L_{lin\_ind}) = \frac{m_b * (L_{lin\_ind})^{\frac{1}{m_c}}}{m_a - (L_{lin\_ind})^{\frac{1}{m_c}}} \quad (8)$$

and $$f_y(L_{med\_ind}) = \frac{1}{g * \log_{10}(L_{med\_ind}) + o} \quad (9)$$

Where $m_a$, $m_b$, $m_c$ are the adaptable extrinsic parameters previously mentioned, o is a predetermined offset, and g is a predetermined gain value.

As for the embodiment illustrated in FIG. 2, when the element value of the input luminance $L_{lin}$ and the general variable value $L_{med}$ respectively matches indexed values, the element value of the output luminance $L_{out}$ corresponds to the output value $L_{out\_pred}$ associated to said indexed value in the 2DLUT. Otherwise, the element value of the output luminance $L_{out}$ is interpolated from two output values $L_{out\_pred}$ from the set of predetermined output values as explained below with reference to FIG. 5.

In a last step S52, the output luminance component $L_{out}$ is processed to get the output color components $R_{sdr}$, $G_{sdr}$ and $B_{sdr}$ according to the same color model than the input color components, by using the linear input color component $R_{hdr}$, $G_{hdr}$ and $B_{hdr}$.

Figure 4:
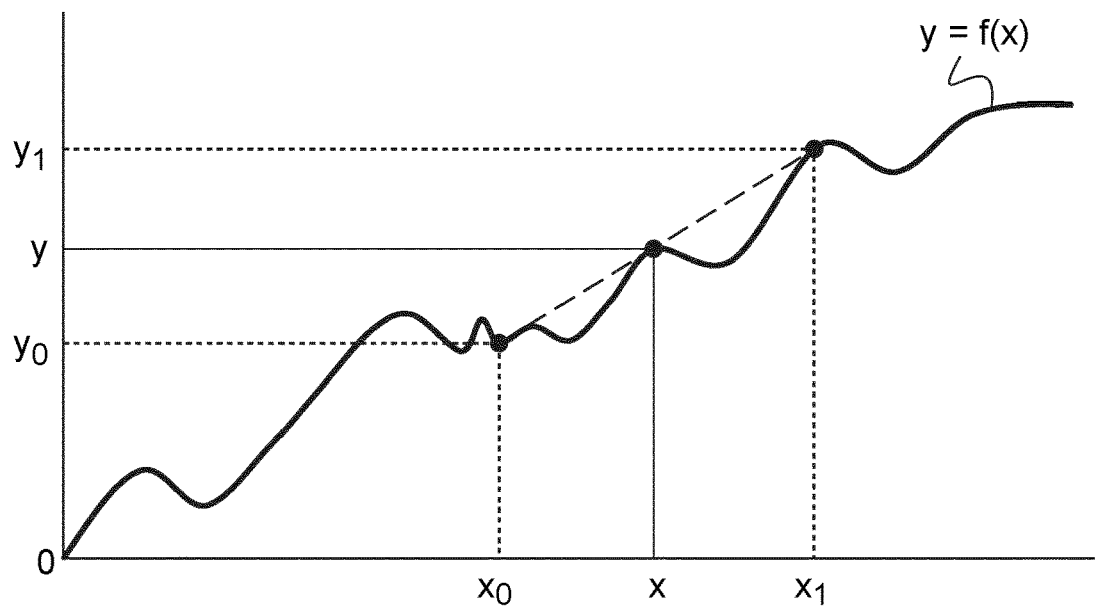
FIG. 4 shows a curve involved in a 1-dimension interpolation process.

FIG. 4 illustrates more in detail the interpolation process which can be implemented in the 1DLUT used for performing the step S21. Indeed when the value of the element value of the input luminance $L_{lin}$ is not indexed, the element value of intermediate luminance $L_m$ is interpolated from two values of the other set of predetermined output values. A curve is plain line represents the real function f which would model the values taken by the element of intermediate luminance component $L_m$ according to the input luminance element values.

First the interpolating process comprises determining the closest coordinates $x_0$ and $x_1$ from x, x being the element value of the input luminance $L_{lin}$. The value of x is truncated to the resolution of the 1 DLUT. Second, $y_0$ and $y_1$ which are the corresponding value to $x_1$ and $x_0$ are fetched from the indexed value of the 1 DLUT. Third, the local derivative dy/dx is determined, knowing that y=f(x). The local derivative is represented by a dashed line. Then an offset dy is calculated and finally this offset is added to $y_0$ to get the final value of y.

Figure 5:
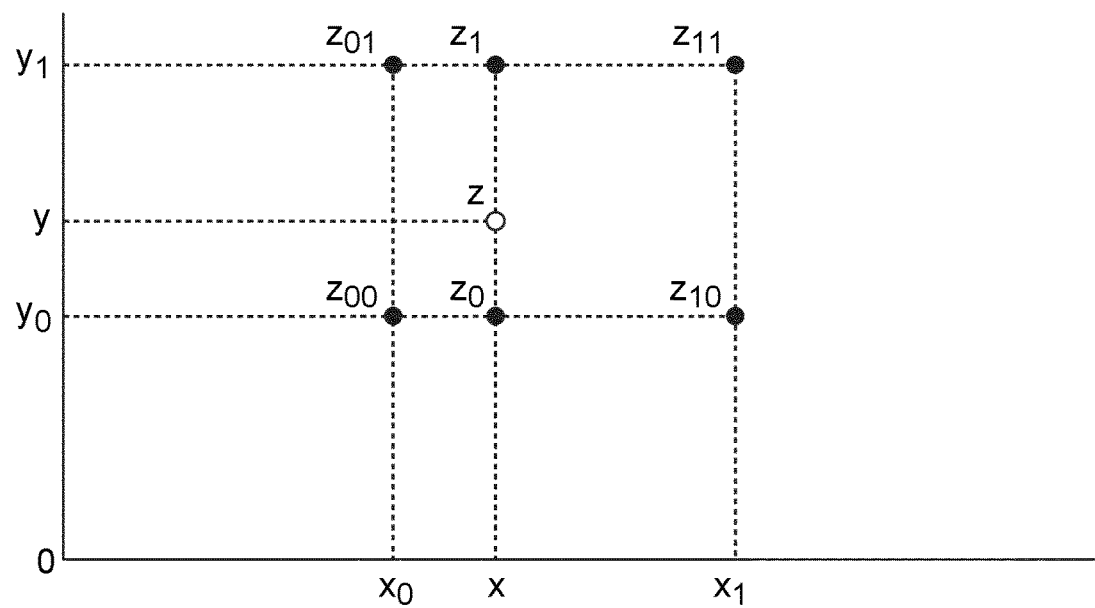
FIG. 5 shows a curve involved in a 2-dimension interpolation process.

FIG. 5 illustrates more in detail the interpolation process implemented in the 2DLUT used for performing the step S4, or its implementations either the step S41 or the step S42. In this case two dimensions x and y are considered, given to arrays of information are indexed (input luminance element values and general variable values). In this case, the interpolation process for the 2D LUT can be considered as two one dimension interpolation processes previously described. First the interpolation process comprises determining the closest indexed coordinates $x_0$ and $x_1$ from x, x corresponding to the value of the first indexed information. x is truncated to the resolution of the 2DLUT. Second the closest indexed coordinates $y_0$ and $y_1$ from y are determined, y corresponding to the value of the second indexed information. y is truncated to the resolution of the 2DLUT. Third the indexed intersection points $z_{00}$ and $z_{01}$ corresponding to input $x_0$, $y_0$ and $x_0$, $y_1$ respectively, are fetched. They allow determining $z_0$. Fourth the intersection points $z_{10}$ and $z_{11}$ corresponding to input $x_1$, $y_0$ and $x_1$, $y_1$ respectively, are fetched. They allow determining $z_1$. Finally a final value $z$ is interpolated from the y axis and the values $z_0$ and $z_1$ previously obtained from the 2D LUT, the value of $z$ corresponding to the element value of the input luminance component.

Figure 6:
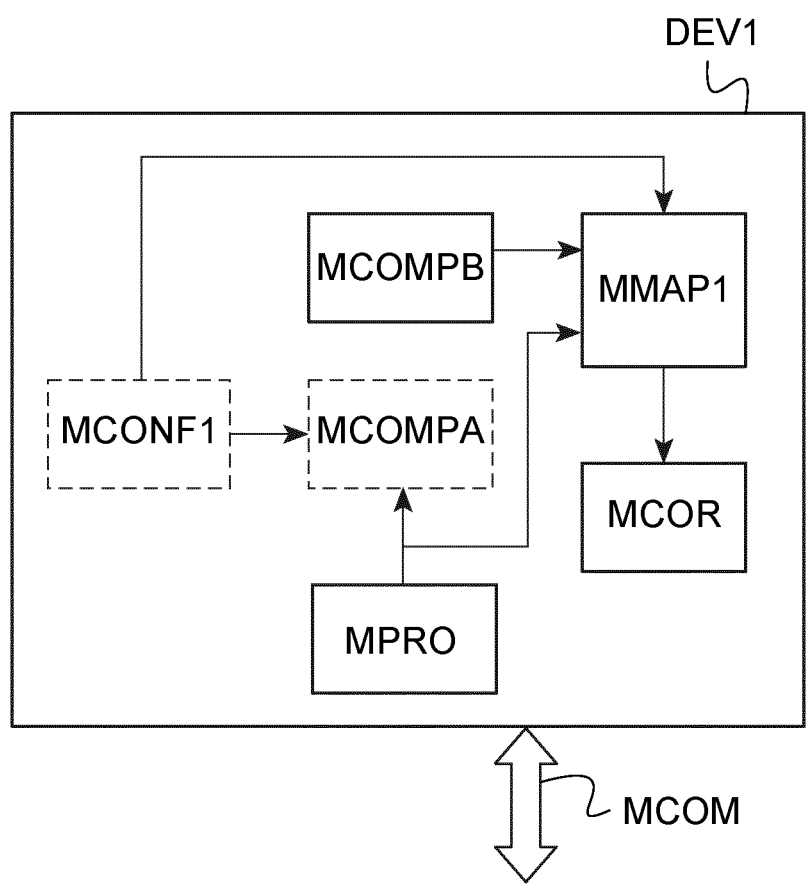
FIG. 6 illustrates an embodiment of a device according to the second aspect of the invention.

FIG. 6 illustrates schematically an embodiment of a device DEV1 according to the invention. Said device is able to implement the conversion method above described, according to any of the different embodiments.

First, the device DEV1 is able to receive and to provide data with external units via communication means MCOM.

The device may be configured to implement either the tone compression or the tone expansion process, or both of them. In that case, the device DEV1 may comprise optional configuration means MCONF1 for adapting first computing means MCOMP1 and mapping means MMAP1 according to the conversion being processed.

The device DEV1 includes processing means MPRO for processing input image data according to the adopted color model in order to obtain an input luminance component. Optionally the processing means MPRO are paired with first computing means MCOMP1 which are able to pre-process the input luminance component. The configuring means MCONF1 may configure the first computing means MCOMPA to pre-process the input luminance component by using a 1D LUT or to apply an Identity function to output the same input luminance component to second computing means MCOMPB. When the device DEV1 only implements the tone compression process, it may not include the first computing means MCOMPA, the processing means MPRO being directly paired to the second computing means MCOMPB.

Said second computing means MCOMPB are able to compute the general variable value from the output data of the first computing means MCOMPA (or directly from the output of the processing means MPRO if said first computing means MCOMPA are not included).

The device DEV1 further comprises the above mentioned mapping means MMAP1 able to receive the general variable value and the input luminance component, element per element.

The mapping means MMAP1 comprise here:

a 2D look-up table (2DLUT) for indexing input luminance element values, general variable values and corresponding pre-determined output luminance values memorized by using internal or external storing unit (not illustrated), and an interpolation unit able to interpolate the element values of the output luminance component when necessary.

Finally, correcting means MOOR are able to provide the output image component (here $R_{hdr}$, $G_{hdr}$ and $B_{hdr}$) from the output of the mapping means MMAP. In an alternative, the correcting means MOOR may be external to the processor.

In one example said device DEV1 may be a processor (for example a microprocessor) designed for executing successively a plurality of instructions of a computer program stored in a storing unit (not illustrated). In another example, the device DEV1 may be a programmable logic device like a Field Programmable Gate-Array (FPGA). This one is particularly adapted for implementing the invention given it has a limited energy consumption and a small size facilitating its integration in larger systems.

Figure 7:
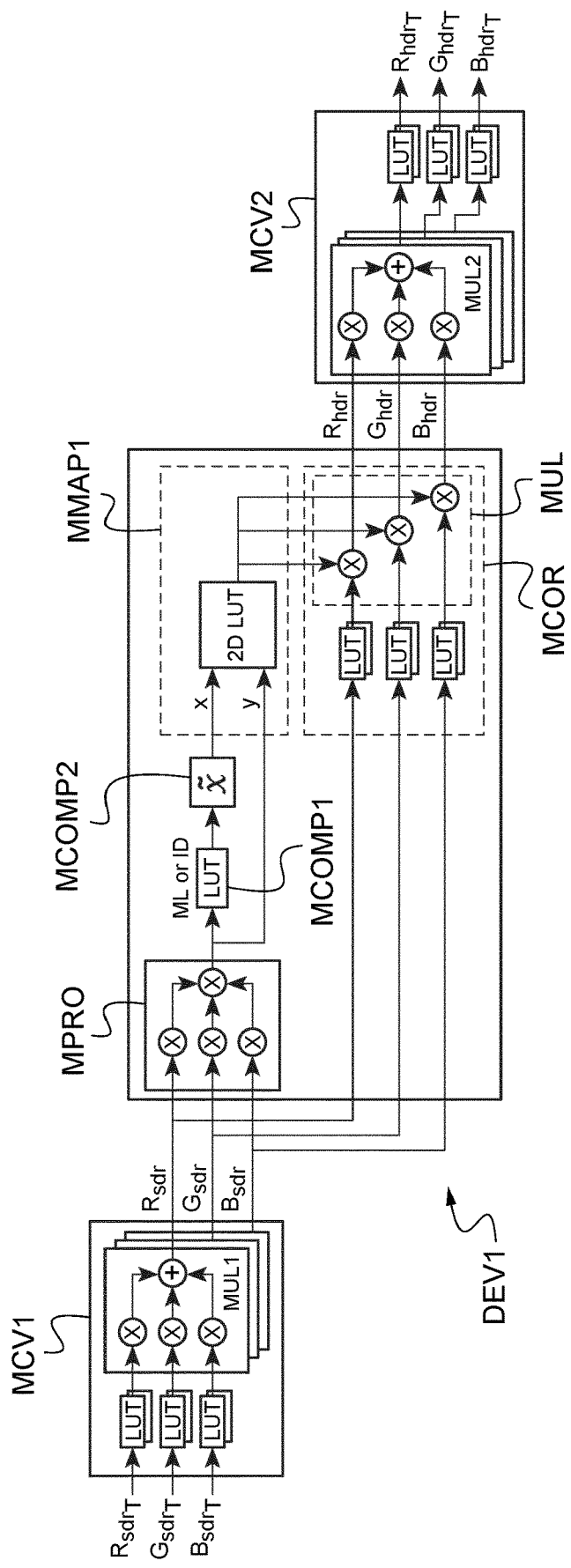
FIG. 7 represents an implementation of the device of FIG. 6 by using an FPGA.

FIG. 7 illustrates a way of implementing the device DEV1 when using an FPGA. In this example, optional configuring means are not included, and the FPGA allows converting SDR image into an HDR image.

The device DEV1 comprises first conversion means MCV1 for converting the RGB encapsulated input components $R_{sdr_T}$, $G_{sdr_T}$, $B_{sdr_T}$ into the linear color components $R_{sdr}$, $G_{sdr}$, $B_{sdr}$. The RGB encapsulated input components transmitted through the communication means, are encapsulated into a transport stream to be transmitted, each color component being expressed over 10 bits. The conversion into linear color components involves look-up-tables LUT and a matrix multiplication by multiplication means MUL1 which provide the linear components expressed over 16 bits, on which further operations can be performed.

The processing means MPRO are designed for calculating pixel per pixel, a weighted sum using the linear components provided by the conversion means MCV1. The weighted sum corresponds to the linear luminance value $L_{lin}$ associated to each pixel.

The first computing means MCOMP1 are realized using a 1 DLUT, and the second computing means MCOMP2 are realized using a median filter. In case the same device is used to perform a conversion from SDR format to HDR format, the first computing means MCOMP1 are also able to implement the Identity function as detailed above, with reference to the FIG. 3.

The median value computed by the second computing means MCOMP2 is transmitted to the mapping means MMAP1 together with the input luminance component made of a 2D look-up table. The mapping means MMAP1 provide the output luminance values according to the embodiments detailed with reference to the FIG. 3.

The means MCOR comprising three look-up tables able to receive the linear components from the conversion means MCV1 to compute the linear output color components $R_{hdr}$, $G_{hdr}$, $B_{hdr}$. The correction means allows to perform the additional saturation correction by using three LUT connected to three multipliers MUL able to receive the output luminance component values from the mapping means respectively, each multiplier allowing to implement the equation 6 above mentioned.

Finally the device DEV1 comprises second conversion means MCV2 for converting back the linear color components $R_{hdr}$, $G_{hdr}$, $B_{hdr}$ into RGB encapsulated input components $R_{hdr_T}$, $G_{hdr_T}$, $B_{hdr_T}$ compatible with transportation through communication means. As for the first conversion means, the conversion made by the second conversion means MCV2 involves look-up-tables LUT and a matrix multiplication by multiplication means MUL2.

According to a third aspect of the invention, it is proposed a method for converting at least one input image from a video sequence, the input image comprising an input luminance component made of elements, into an output image comprising an output luminance component made of elements. The method comprises obtaining a configuration among a set of predetermined configurations, each configuration being defined by a converting function and at least one feature from a list of possible features, configuring a Look-Up Table (LUT) by using the obtained configuration, said LUT comprising at least one input array indexing a set of chosen input luminance component values, each pre-determined output value from a set of predetermined output luminance element values matching one indexed input luminance component value, and for at least one input image determining the output luminance component element values by transforming each input luminance component element value into a corresponding output luminance component element value by using at least one pre-determined output value, and converting the input image into the output image using the provided output luminance component element values, wherein the list of possible features comprising at least the two following features :
a) one or more adaptable parameters set for the whole video sequence by an operator according to a given context, said adaptable parameters being used to update each indexed input luminance element value to said context, and
b) an exponent based on at least two input luminance component element values, such that each output value of the set of predetermined output values is predetermined by raising the corresponding indexed input luminance element value to said exponent.

In an embodiment at least one configuration is defined by a combination of at least two features from said list of possible features.

In an embodiment each configuration defines one type of conversion and for at least one type of conversion, the respective ranges of the output luminance component values and the input luminance component element values are of different range extension.

In an embodiment each configuration defines one type of conversion and at least one type of conversion implements a conversion of an input image using a first function for transferring an electronic signal into an optical signal, into an output image using a second function for transferring an electronic signal into an optical signal.

According to a fourth aspect of the invention it is proposed a device for converting at least one input image from a video sequence, the input image comprising an input luminance component made of elements, into an output image comprising an output luminance component made of elements. The device is configured for obtaining a configuration among a set of predetermined configurations, each configuration being defined by a converting function and at least one feature from a list of possible features, configuring a Look-Up Table (LUT) by using the obtained configuration, said LUT comprising at least one input array indexing a set of chosen input luminance component values, each pre-determined output value from a set of predetermined output luminance element values matching one indexed input luminance component value, and for at least one input image determining the output luminance component element values by transforming each input luminance component element value into a corresponding output luminance component element value by using at least one pre-determined output value, and converting the input image into the output image using the provided output luminance component element values, wherein the list of possible features comprising at least the two following features :
a) one or more adaptable parameters set to chosen values for the whole video sequence by an operator according to a given context, said adaptable parameters being used to update each indexed input luminance element value to said context, and
b) an exponent such that each output value of the set of predetermined output values is predetermined by raising the corresponding indexed input luminance element value to said exponent.

Figure 8:
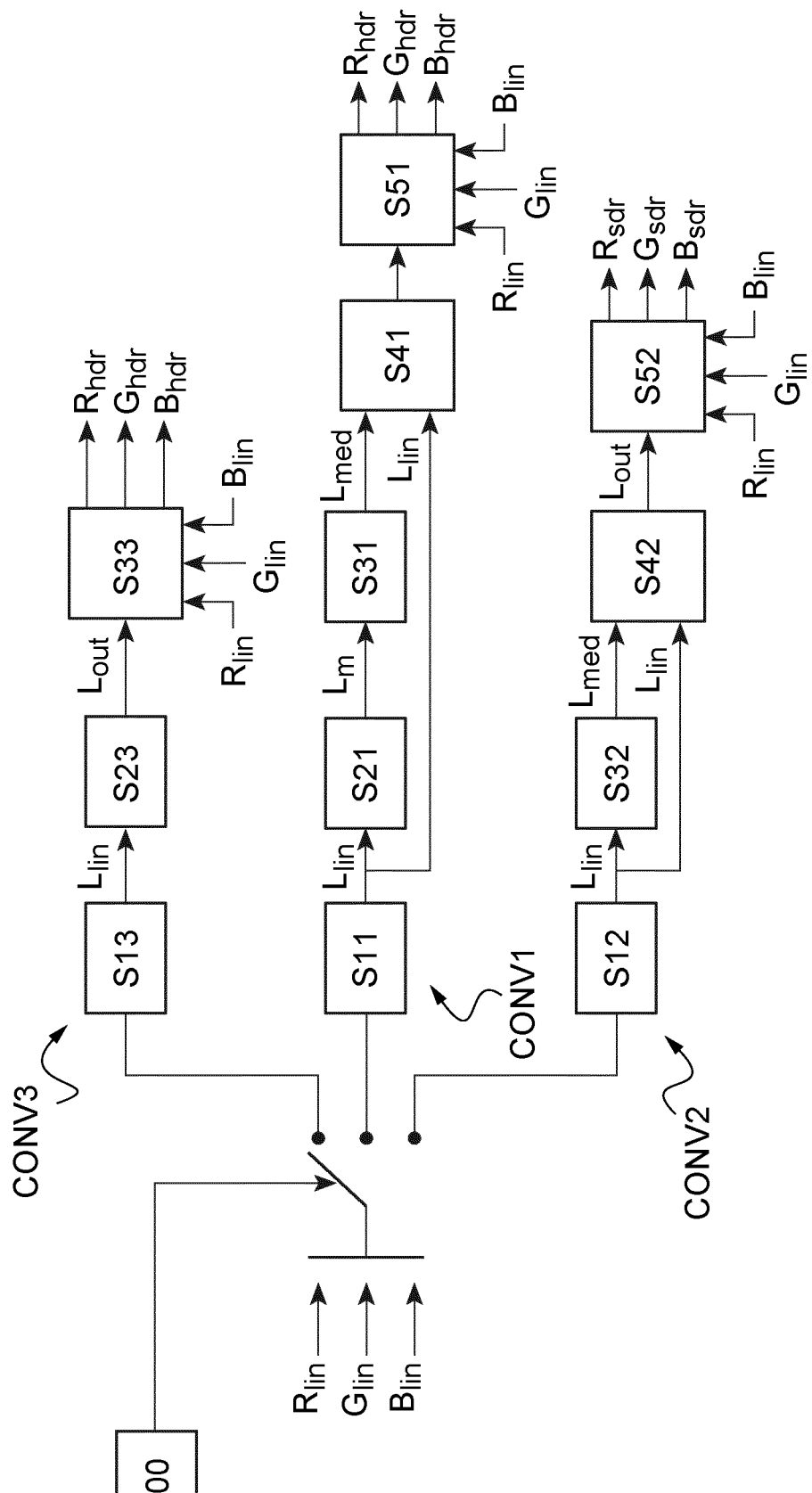
FIG. 8 illustrates an embodiment of a method according to the third aspect of the invention.

FIG. 8 illustrates an example of a method according to the third aspect of the invention. In a preferred embodiment, three types of conversions are considered:
converting a SDR input image into an HDR output image, CONV1;
converting an HDR input image into a SDR output image, CONV2; and
converting the EOTF ("Electro-Optical Transfer Function") of an input image, CONV3.

The third aspect of the invention is not limited to those three types of conversion. For example only two types of conversion may be implemented. Another type of conversion may be converting the contrast of an input image from a first value to a second value, in case some details of the image need to be enhance.

The two first types of conversion CONV1 and CONV2 are described with reference to FIGS. 2 and 3. The last type of conversion CONV3 deals with luminance transformations necessary for changing the EOTF used to encode HDR image content. For example, we might convert content encoded using the PQ EOTF to content encoded using the HLG EOTF. Such transformations are known and described in standard reports such as "International Telecommunication Union," "High dynamic range television for production and international programme exchange," Recomm. ITU-R BT.2390, vol. 0, 2016.

A first step S00 comprises obtaining a configuration among a set of predetermined configurations, each configuration being defined by at least one feature from a list of possible features. In this example, each configuration is associated to one of the three types on conversion listed above.

If the first configuration is selected, input color components $R_{lin}$, $G_{lin}$, $B_{lin}$ are provided in input to the step S11 of the first conversion process CONV1 to get output color components for HDR content $R_{hdr}$, $G_{hdr}$, $B_{hdr}$. In this case the input color components $R_{lin}$, $G_{lin}$, $B_{lin}$ contain SDR images. The steps S11, S21, S31, S41 and S51 are already described with reference to FIG. 2. The selected configuration is defined by a function allowing the first type of conversion (for example according to the above mention equation 2) and by a combination of two features which are:
the adaptable parameters $m_a$, $m_b$, and $m_c$ above mentioned set to chosen values for the whole video sequence by the operator according to a given context, said adaptable parameters being used to update each indexed input luminance element value to said context as already explained, and
the exponent $f_y$, here based on at least two input luminance component element values, such that each output value of the set of predetermined output values is predetermined by raising the corresponding indexed input luminance element value to said exponent as already explained.

If the second configuration is selected, input color components $R_{lin}$, $G_{lin}$, $B_{lin}$ are provided in input to the step S12 of the second conversion process CONV2 to get output color components for SDR content $R_{sdr}$, $G_{sdr}$, $B_{sdr}$. In this case the input color components $R_{lin}$, $G_{lin}$, $B_{lin}$ contain HDR images. The steps S12, S32, S42 and S52 are already described with reference to FIG. 3. The selected configuration is defined by a function allowing the second type of conversion (for example according to the above mention equation 3) and by a combination of two features which are:
the adaptable parameters $m_a$, $m_b$, and $m_c$ above mentioned set to chosen values for the whole video sequence by the operator according to a given context, said adaptable parameters being used to update each indexed input luminance element value to said context as already explained, and the exponent $f_y$, here based on at least two input luminance component element values, such that each output value of the set of predetermined output values is predetermined by raising the corresponding indexed input luminance element value to said exponent as already explained.

If the third configuration is selected, input color components $R_{lin}$, $G_{lin}$, $B_{lin}$ in are provided in input to a step S13 of the third conversion process CONV3 to get output color components for HDR content $R_{hdr}$, $G_{hdr}$, $B_{hdr}$. In this case the input color components $R_{lin}$, $G_{lin}$, $B_{lin}$ comprise HDR images.

Like step S11 and step S12, the step S13 allows processing the input color components $R_{lin}$, $G_{lin}$ and $B_{lin}$ are processed to obtain the input Luminance component $L_{lin}$ according to known methods explained above.

In the case of the HLG EOTF conversion, the input luminance component is transformed into the output luminance component according to the function below:

$$L_{out} = \frac{L_{lin}^{\gamma}}{L_{lin}} \qquad (8)$$

A system exponent y is defined to be applied to the input luminance component $L_{lin}$. The additional division per $L_{lin}$ allows here to adjust the saturation. For instance, y=1.2 in case of an HLG OOTF conversion.

Preferably, the step S23 may involve using another set of pre-determined output values $L_{out\_pred}$. This other set could be organized into a 1D Look-Up-Table (1D LUT) comprising one input array indexing a set of chosen input luminance component element values $L_{lin\_ind}$ such as:

$$L_{out\_pred} = \frac{L_{lin\_ind}^{\gamma}}{L_{lin\_ind}}. \qquad (9)$$

When the input luminance component values is not indexed, the element values of the output luminance component $L_{out}$ are interpolated using at least one of the of pre-determined output values $L_{out\_p}$red as already explained with reference to FIG. 4.

The selected configuration is defined by a function allowing the third type of conversion (for example according to the above mention equation 9) and by a feature which is:
the system exponent y such that each output value of the set of predetermined output values is predetermined by raising the corresponding indexed input luminance element value to said exponent.

The last step S33 involves converting the output luminance component $L_{out}$ into the output color components $R_{hdr}$, $G_{hdr}$, $B_{hdr}$ containing converted HDR images according to $R_{lin}$, $G_{lin}$, $B_{lin}$ as previously described with reference to step S5 in FIG. 1.

Figure 9:
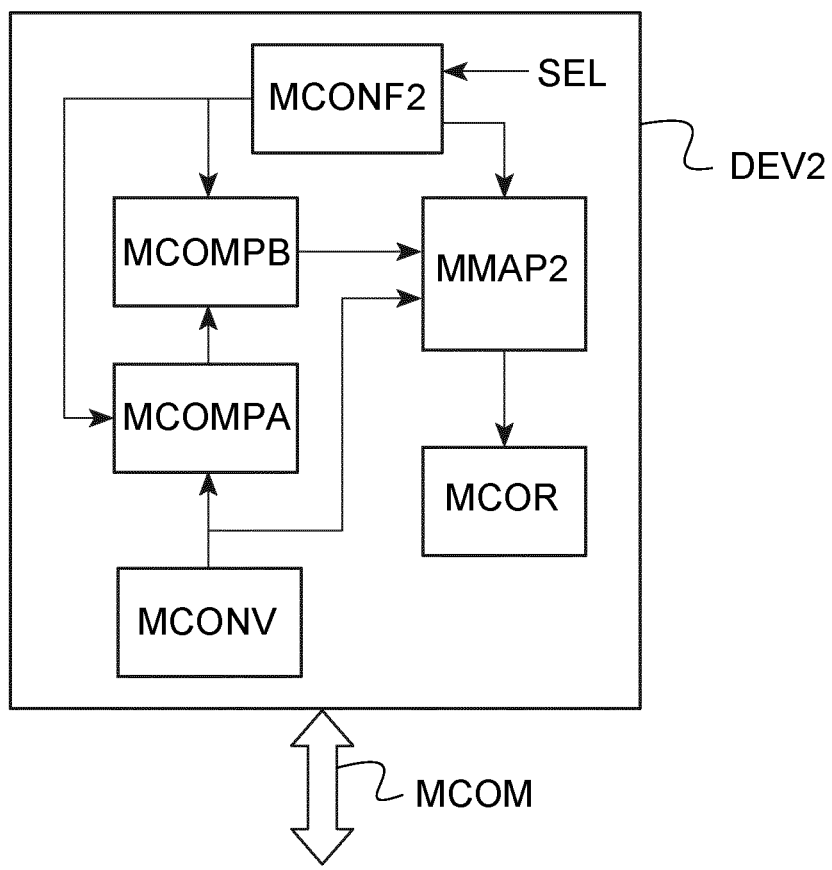
FIG. 9 illustrates an embodiment of a device according to the fourth aspect of the invention.

FIG. 9 illustrates schematically an embodiment of a device DEV2 according to the fourth aspect of the invention. Said device is able to implement the conversion method described with reference to FIG. 8.

First, the device DEV2 is able to receive and to provide data with external units via communication means MCOM. They are able to receive a control signal SEL to be provided to configuring means MCONF2 for selecting one of the possible configurations. For example, the control signal SEL could be generated by an operator or be based on an analysis of the input image (whether the content is SDR of HDR content for example).

The device DEV2 may be configured to implement the different type of conversions listed above. The configuration means MCONF2 are able to configure first and second computing means MCOMPA and MCOMPB and mapping means MMAP2 for performing one type of conversion as already explained with reference to FIG. 6.

The configuration means MCONF2 are able:
to configure the mapping means MMAP2 for performing the third type of conversion, by using the appropriate 1 DLUT, and
to configure the first and second computing means MCOMPA and MCOMPB based on the selected type of conversion, for instance by making the first computing means MCOMPA able to apply an Identity function to output the same input luminance component to second computing means MCOMPB when the second CONV2 or the third CONV3 type of conversion is selected.

The different values involved in the 1 DLUT and 2DLUTs used by the mapping means MMAP2 according to the type of conversion, are memorized in an internal or external storing unit (not represented). The mapping means MMAP2 further comprise an interpolation unit able to interpolate the element values of the output luminance component when necessary.

The device DEV2 may be a processor (for example a microprocessor) designed for executing successively a plurality of instructions of a computer program stored in a storing unit (not illustrated). In another example, the device DEV2 may be a programmable logic device like a Field Programmable Gate-Array (FPGA). This device is particularly adapted for implementing the invention given it has a limited energy consumption and a small size facilitating its integration in larger systems.

Advantageously, the device according to the fourth aspect of the invention:
gets lower resource usage, as the implementation is compact;
request an easy maintenance as fewer means are present;
can dynamically switch from one type of conversion to another (e.g. from luminance compression to expansion, or modify the luminance mapping profiles used).

As the same architecture is applicable to all types of conversion, it suffices to change the values of the optional 1D LUT and the 2D LUT to change the conversion performed. Thus, the device can adapt to future conversions as the architecture allows for a lot of flexibility.

The invention claimed is:

1. A method for converting an input image including an input luminance component made of input luminance component elements into an output image including an output luminance component made of output luminance component elements, respective ranges of output luminance component element values and input luminance component element values being of different range extensions, the method comprising, for the input image;
computing a general variable value representative of at least two of the input luminance component element values;
transforming each input luminance component element value into a corresponding output luminance component element value according to the computed general variable value; and converting the input image using the output luminance component element values, wherein the transforming uses a set of predetermined output values organized into a 2D Look-Up-Table comprising two input arrays indexing a set of specific input luminance component element values and a set of specific general variable values respectively, each predetermined output value matching a pair of values made of an indexed input luminance component element value and an indexed general variable value, the input luminance component element value being transformed into the output luminance component element value using at least one of the predetermined output values.

2. The method of claim 1, wherein the input image belongs to a video sequence comprising a plurality of input images, the transforming being further based on adaptable parameters set for the whole video sequence by an operator according to a specific context, said adaptable parameters being used to update each of the indexed input luminance component element values to said context.

3. The method of claim 2, further comprising processing the output image to be displayed on a display device, values of said adaptable parameters being adaptable according to display device characteristics forming said context.

4. The method of claim 2, wherein each predetermined output value $L_{out\_pred}$ of the set of output values is predetermined according to the following formula:

$$L_{out\_pred} = \frac{f_m(L_{lin\_ind})^{f_\gamma(L_{med\_ind})}}{L_{lin\_ind}^s}$$

where $L_{med\_ind}$ is the indexed general variable value,
$L_{lin\_ind}$ is the indexed input luminance component element value,
$f_m$ is a function based on said adaptable parameters,
s is a control parameter, and
$f_\gamma$ is an exponent.

5. The method of claim 4, wherein the functions $f_m$ and $f_\gamma$ are defined according to the following formulas:

$$f_m(L_{lin\_ind}) = \frac{m_b * (L_{lin\_ind})^{\frac{1}{m_c}}}{m_a - (L_{lin\_ind})^{\frac{1}{m_c}}}$$

and $$f_\gamma(L_{med\_ind}) = \frac{1}{g * \log_{10}(L_{med\_ind}) + o}$$

where $m_a$, $m_b$, $m_c$ are the adaptable parameters,
o is a predetermined offset, and
g is a predetermined gain value.

6. The method of claim 4, further comprising determining an intermediate luminance component made of elements, by transforming each of the input luminance component element values into an intermediate luminance component element value by using another set of predetermined output values based on the adaptable parameters, and wherein the general variable value is computed by using the intermediate luminance component element values.

7. The method of claim 2, wherein each predetermined output value $L_{out\_pred}$ of the set of output values is predetermined according to the following formula:

$$L_{out\_pred} = \frac{f_m(L_{lin\_ind})^{f_\gamma(L_{med\_ind})}}{L_{lin\_ind}^s}$$

where $L_{med\_ind}$ is the indexed general variable value,
$L_{lin\_ind}$ is the indexed input luminance component element value,
$f_m$ is a function based on said adaptable parameters,
s is a control parameter, and
$f_\gamma$ is the exponent.

8. The method of claim 7, wherein the functions $f_m$ and $f_\gamma$ are defined according to the following formulas:

$$f_m(L_{lin\_ind}^{f_\gamma(L_{med\_ind})}) = \left(\frac{m_a * (L_{lin\_ind})^{f_\gamma(L_{med\_ind})}}{m_b + (L_{lin\_ind})^{f_\gamma(L_{med\_ind})}}\right)^{m_c}$$

and $$f_\gamma(L_{med\_ind}) = g * \log_{10}(L_{med\_ind}) + o$$

where $m_a$, $m_b$, $m_c$ are the adaptable parameters,
o is a predetermined offset, and
g is a predetermined gain value.

9. The method of claim 1, wherein each predetermined output value of the set of predetermined output values is predetermined by raising the matching indexed input luminance component element value to an exponent dependent on the computed general variable value.

10. The method of claim 1, wherein the computing the general variable value comprises computing a measure of central tendency of values representative of two or more input luminance component element values.

11. The method of claim 10, wherein the measure of central tendency is a median.

12. A device for converting an input image including an input luminance component made of input luminance component elements into an output image including an output luminance component made of output luminance component elements, respective ranges of output luminance component element values and input luminance component element values being of different range extensions, the device being configured to:

compute a general variable value representative of at least two of the input luminance component element values, transform each input luminance component element value into a corresponding output luminance component element value according to the computed general variable value, and convert the input image using the output luminance component element values, wherein each input luminance component element value is transformed into the corresponding output luminance component element value using a set of predetermined output values organized into a 2D Look-Up-Table comprising two input arrays indexing a set of specific input luminance component element values and a set of specific general variable values respectively, each predetermined output value matching a pair of values made of an indexed input luminance component element value and an indexed general variable value, the input luminance component element value being transformed into the output luminance component element value using at least one of the predetermined output values.

13. The device of claim 12, wherein the input image belongs to a video sequence comprising a plurality of input images, and wherein each of the input luminance component element values is transformed into the corresponding output luminance component element value further based on adaptable parameters set for the whole video sequence by an operator according to a specific context, said adaptable parameters being used to update each of the indexed input luminance component element values to said context.

* * * * *